Sept. 15, 1931.    F. C. BIGGERT, JR    1,822,950
SPEED INDICATOR
Filed Dec. 14, 1929
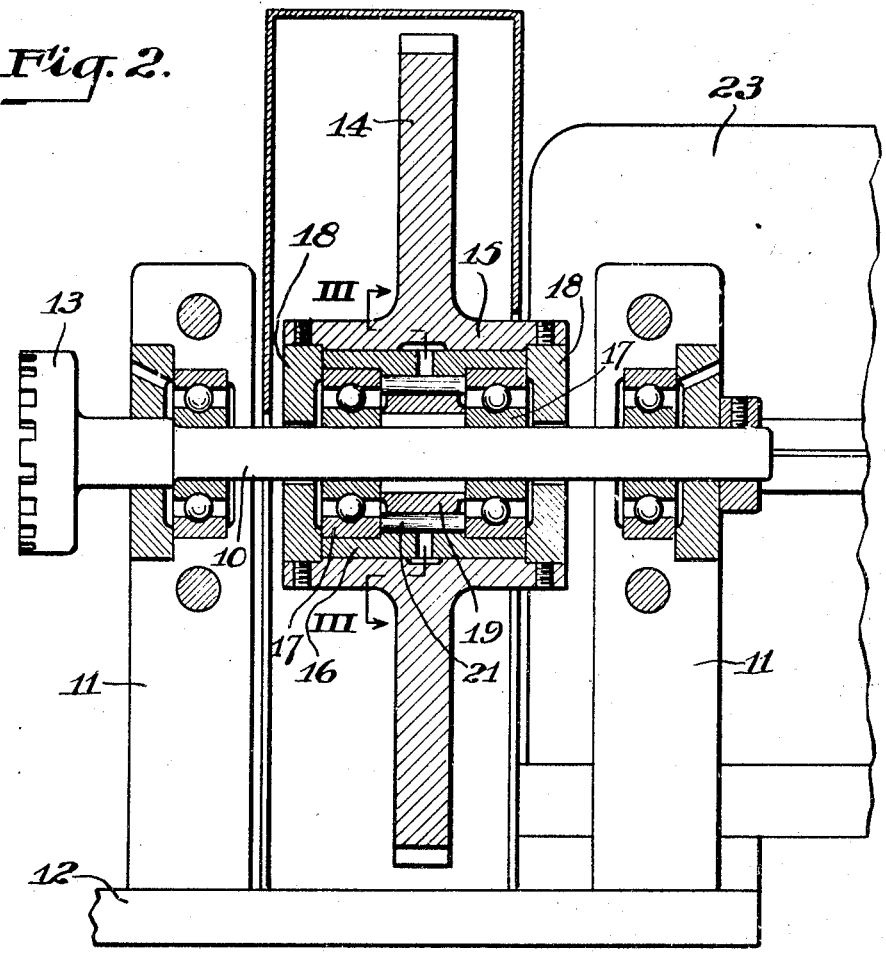
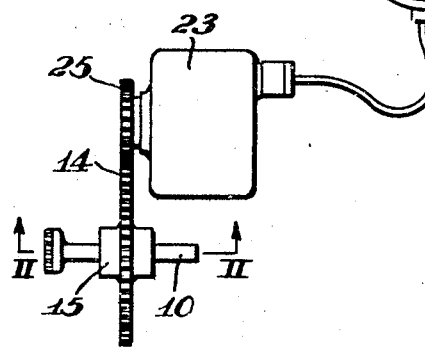
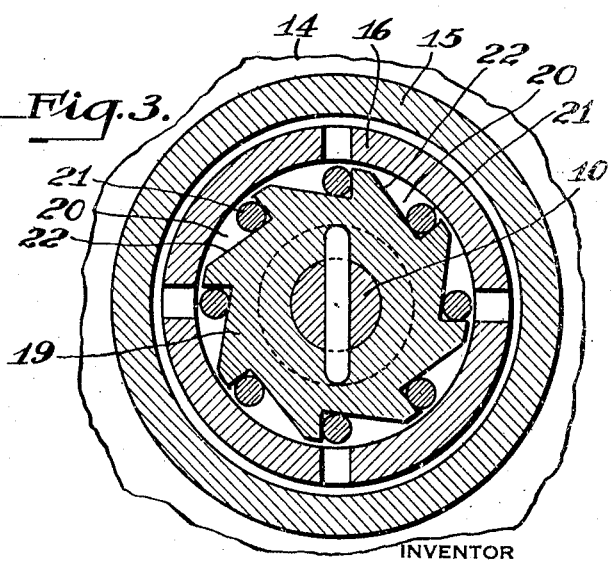

Patented Sept. 15, 1931

1,822,950

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

SPEED INDICATOR

Application filed December 14, 1929. Serial No. 414,201.

My invention pertains to peak speed indicators, that is to say devices for enabling a reading to be taken of the highest speed attained by a member to which is imparted a rotating or oscillating movement of non-uniform speed.

Occasions frequently present themselves where it is desirable that the highest speed attained by moving members be ascertainable and where the rapidity of the change in speed of such member is such as to make a reading by an ordinary indicator exceedingly difficult or impossible. An example occurs in the case of the flying cutter disclosed in the joint application of myself and John A. Smitmans filed October 25, 1929. In this device a blade is started from rest and accelerated so that its speed of rotation is the same as the linear speed of the moving metal to be cut by the time the cutting point is reached, the blade being thereafter decelerated and brought to rest again. The whole movement is exceedingly rapid, so that it would be very difficult, if not impossible, for an operator to read the highest speed attained (the speed at the cutting instant) by means of an ordinary indicator. It is an object of my invention to provide a peak speed indicator which will meet such conditions as these, and enable a reading to be taken readily of the highest speed attained by members moving at speeds which are high but non-uniform. Another object is to provide such a peak speed indicator which will be sturdy in construction and economical to produce.

I have described, by way of example, in the following specification an indicator constructed in accordance with my invention, and shown the same in the accompanying drawings, in which:

Fig. 1 is a schematic view of the device;

Fig. 2 is an enlarged sectional view of the ratchet-actuated fly wheel gear, as seen from the line II—II of Fig. 1; and Fig. 3 is a section, on a scale further enlarged, on the line III—III of Fig. 2, showing the hub of the fly wheel gear and the ratchet device associated therewith.

Referring now to the drawings, 10 designates a shaft mounted to rotate in roller bearings carried by a pair of standards 11 extending from a base 12. The shaft 10 has at one end a connection member 13 by means of which a driving connection may be established between it and the member the peak speed of which is required to be indicated. In the case of the flying cutter above referred to, the connection may be with the blade shaft, the shaft of a motor for actuating the blade, or some other member which moves with the blade.

Upon the shaft 10, between the standards 11, is mounted a fly wheel gear 14, the hub 15 of which is hollow and has secured therein a bearing sleeve 16 mounted to revolve on ball bearings 17 which are held in place by end plates 18 removably secured in the ends of the hollow hub 15. Keyed to the shaft 10, and disposed between the ball bearings 17, is a ratchet disc 19 in the recesses 20 of which rollers 21 are disposed. When the shaft 10 rotates in a clockwise direction (Fig. 3) the rollers 21 will bind between the faces 22 of the recesses in the disc 19 and the inner surface of the sleeve 16, and the fly wheel gear 14 will be rotated, in a well known manner. Such rotation of the fly wheel gear by the shaft 10 will continue as long as the shaft 10 accelerates. However, the fly wheel gear 14 is made of sufficient mass so that it has considerable momentum. Consequently when the shaft 10 begins to decelerate, the fly wheel gear will continue to rotate at the highest speed which it has attained, the rollers 21 then moving towards the shoulder ends of the recesses in the ratchet disc 19. The fly wheel gear will continue to rotate at substantially the maximum speed which it has attained for a long enough time to enable a reading of that speed,—which is the peak speed of the device in connection with which the indicator is used,—to be taken.

For reading such peak speed a magneto 23 provided with an indicator 24 may be employed, the magneto being driven by a pinion 25 meshing with teeth formed in the periphery of the fly wheel gear 14.

The device is exceedingly rugged, simple and economical to make, and by its use the peak speeds of rapidly moving objects can easily and accurately be read. While I have described one form of device constructed according to my invention, it will be understood that the invention may be embodied in other forms without exceeding the scope thereof as defined in the appended claims.

I claim:

1. In a device for indicating the peak speed attained by a shaft, the combination with a fly wheel mounted to rotate with the shaft in one direction of rotation of the latter and be free of said shaft in the other direction of rotation, said fly wheel being of mass sufficient that it will temporarily continue to rotate at substantially the highest speed at which it may have been driven by said shaft despite reduction of speed of said shaft, of means for indicating the speed of said fly wheel.

2. A peak speed indicating device comprising a shaft, a member associated with said shaft, means for indicating the speed of said member, and means for effecting a driving connection between said member and said shaft in one direction of rotation of said shaft leaving said member and shaft free to rotate relatively in the opposite direction, said member being of mass sufficient that it will temporarily continue to rotate at substantially the highest speed at which it may have been driven by said shaft despite reduction of speed of said shaft.

3. In a device for indicating the peak speed attained by a shaft, the combination of a fly wheel gear mounted to rotate with the shaft in one direction of rotation of the latter and be free of the shaft in the other direction of rotation, said fly wheel being of mass sufficient that it will temporarily continue to rotate at substantially the highest speed at which it may have been driven by said shaft despite reduction of speed of said shaft, of a magneto geared to said fly wheel gear and an indicator for said magneto.

4. A peak speed indicating device comprising a shaft, a fly wheel having a ratchet connection with said shaft, said fly wheel being of mass sufficient that it will temporarily continue to rotate at substantially the highest speed at which it may have been driven by said shaft despite reduction of speed of said shaft, and means for indicating the speed of said fly wheel.

In testimony whereof, I sign my name.

FLORENCE C. BIGGERT, Jr.